United States Patent [19]

Miller

[11] Patent Number: 5,281,758

[45] Date of Patent: Jan. 25, 1994

[54] ELECTRICAL CONTACT WITH SHOCK ABSORBING MEANS

[75] Inventor: Timothy J. Miller, Warren, Pa.

[73] Assignee: GTE Products Corporation, Danvers, Mass.

[21] Appl. No.: 975,490

[22] Filed: Nov. 12, 1992

[51] Int. Cl.$^5$ ............................................. H02G 3/08
[52] U.S. Cl. ................................... 174/52.1; 257/696
[58] Field of Search .................. 174/52.1, 52.5, 50.54; 257/693–697; 439/68

[56] References Cited

U.S. PATENT DOCUMENTS

| | | | |
|---|---|---|---|
| 3,638,149 | 1/1972 | Bopp et al. | 335/91 |
| 3,842,188 | 10/1974 | Petersen | 174/52.1 |
| 3,983,457 | 9/1976 | Smith | 174/52.1 X |
| 4,396,935 | 8/1983 | Schuck | 174/52.1 X |
| 4,427,247 | 1/1984 | Petersen | 439/68 |
| 4,431,983 | 2/1984 | Rodriguez | 174/52.1 X |
| 4,514,587 | 4/1985 | Van Dyk Soerewyn | 174/52.5 |
| 4,609,241 | 9/1986 | Petersen | 439/68 |
| 4,968,269 | 11/1990 | Urani et al. | 439/622 |
| 5,019,829 | 5/1991 | Heckman et al. | 174/52.3 X |

Primary Examiner—Lincoln Donovan
Assistant Examiner—Christopher Horgan
Attorney, Agent, or Firm—William H. McNeill

[57] ABSTRACT

A hollow component has a base and includes at least two electrical contacts mounted within the base. Each of the contacts has a first portion which projects exteriorly of the base and a second portion which projects interiorly of the base. The second portions each include a tine for receiving a fragile, planar article such as a thin, ceramic printed circuit board thereon. Shock-absorbing means are integrally formed with the contacts and are positioned intermediate the tines and the base. The shock-absorbing means can be in the form of a horizontal U-shaped bight.

3 Claims, 2 Drawing Sheets

ELECTRICAL CONTACT WITH SHOCK ABSORBING MEANS

TECHNICAL FIELD

This invention relates to electrical contacts and more particularly, to such contacts including shock absorbing means. Still more particularly, it relates to a component which includes one or more of such electrical contacts.

BACKGROUND ART

Electronic components such, for example, as a manifold pressure transducer for an automotive engine, have comprised a hollow having, mounted therein a planar, fragile ceramic printed board carrying the necessary parts thereon. The board has been attached to electrical contacts which project through the base of the component. It has been found that this form of mounting means transmits shock, for example if the device is dropped, directly to the fragile board resulting in breakage thereof.

DISCLOSURE OF INVENTION

It is, therefore, an object of this invention to obviate the disadvantages of the prior art.

It is another object of the invention to enhance the mounting of fragile circuit boards.

These objects are accomplished, in one aspect of the invention, by the provision of a hollow component including means for mounting a fragile planar article therein. The component has a component base and said means for mounting said planar fragile article comprises at least two electrical contacts mounted within said component base, each of said contacts having a first portion projecting exteriorly of said base and a second portion projecting interiorly of said base; said second portions each including a projection for receiving said planar article thereon; and shock-absorbing means integrally formed with said contacts and positioned intermediate said projection and said component base.

The use of the shock-absorbing means protects the fragile board in the event of droppage or other shock.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
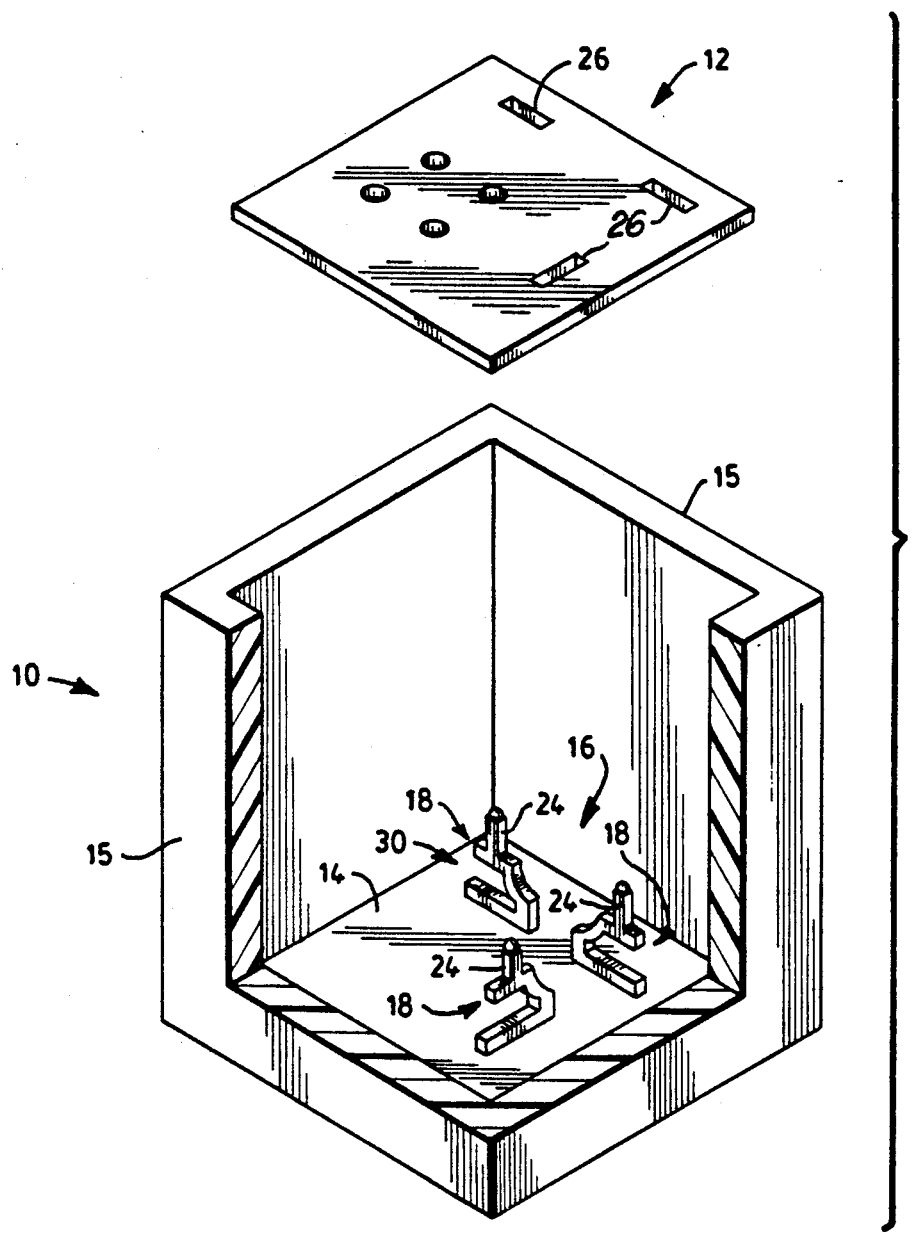
FIG. 1 is an exploded perspective view of a component utilizing an aspect of the invention.
Figure 2:
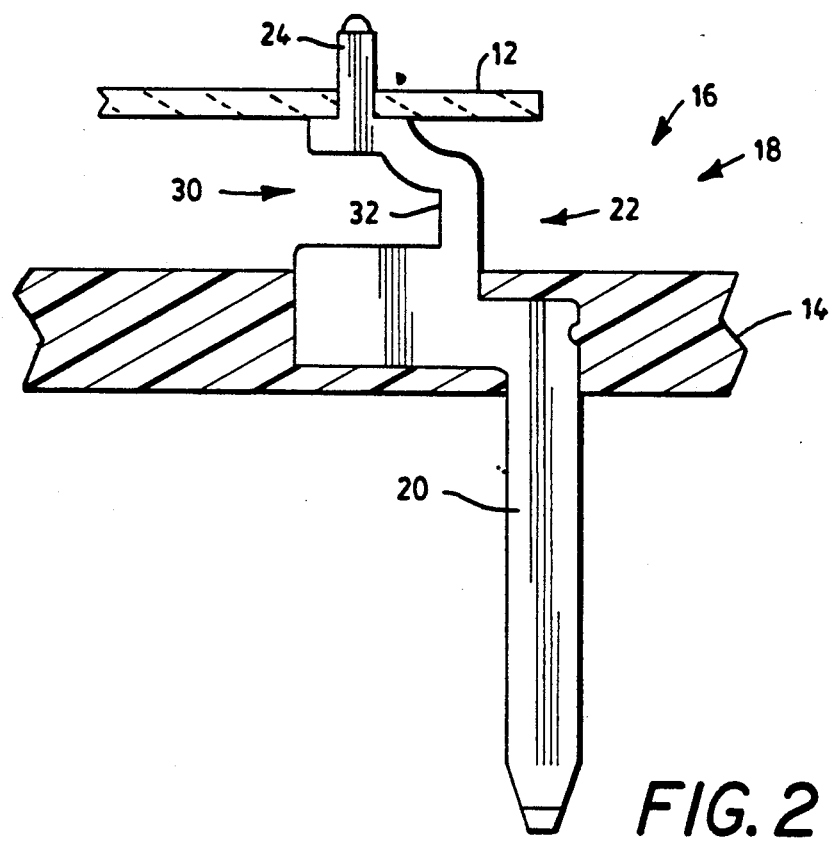
FIG. 2 is an elevational view of a contact illustrating an embodiment of the invention.

Referring now to the drawings with greater particularity, there is shown in FIG. 1 a hollow component 10 which can be a body for a manifold pressure transducer which includes means for mounting a fragile planar article 12 therein. Article 12 can be a ceramic printed circuit board. Component 10 has a component base 14 surrounded by upstanding walls 15. Mounting means 16 for mounting the planar fragile article 12 comprises at least two electrical contacts 18 mounted within component base 14, as by insert molding. Each of the contacts 18, one of which is shown in detail in FIG. 2, have a first portion 20 projecting exteriorly of the base 14 and a second portion 22 projecting interiorly of the base. The second portions 22 each include a tine 24 for receiving the planar article thereon via apertures 26 formed therein. Shock-absorbing means 30 are integrally formed with the contacts and are positioned intermediate the tine 24 and the component base 14. In the embodiment shown, the shock-absorbing means 30 is in the form of a horizontal U-shaped bight 32 which extends between the tine 24 and the base 14. The flexibility of this shock-absorbing means protects the fragile board 12 in the event of its being dropped or otherwise sustaining a like shock.

While there have been shown and described what are at present considered to be the preferred embodiments of the invention, it will b to those skilled in the art that various changes and modifications can be made herein without departing from the scope of the invention as defined by the appended claims.

What is claimed is:

1. A hollow component including means for mounting a fragile planar article therein, said component having: a component base; said means for mounting said planar fragile article comprising at least two electrical contacts mounted within said component base, each of said contacts having a first portion projecting exteriorly of said base and a second portion projecting interiorly of said base; said second portions each including a tine for receiving said planar article thereon; and shock-absorbing means integrally formed with said contacts and positioned intermediate said tine and said component base.

2. A hollow component including means for mounting an apertured, fragile planar article therein, said component having: a component base; si means for mounting said apertures, fragile, planar article comprising at least two electrical contacts mounted within said component base, each of said contacts having a first portion projecting exteriorly of said base and a second portion projecting interiorly of said base; said second portions each including a tine for receiving an aperture of said apertured, fragile, planar article thereon; and shock-absorbing means integrally formed with said contacts and positioned intermediate said tine and said component base.

3. The component of claim 2 wherein said base is quadrangular and said mounting means comprises three electrical contacts, each of said contacts being located substantially at a corner of said base.

* * * * *